United States Patent
Duan

(10) Patent No.: US 10,219,028 B2
(45) Date of Patent: Feb. 26, 2019

(54) DISPLAY, DISPLAY DEVICE, PLAYER, PLAYING DEVICE, AND PLAYING DISPLAY SYSTEM

(71) Applicant: BOE Technology Group Co., Ltd., Beijing (CN)

(72) Inventor: Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 15/129,980

(22) PCT Filed: Oct. 22, 2015

(86) PCT No.: PCT/CN2015/092518
§ 371 (c)(1),
(2) Date: Sep. 28, 2016

(87) PCT Pub. No.: WO2016/184033
PCT Pub. Date: Nov. 24, 2016

(65) Prior Publication Data
US 2017/0134796 A1    May 11, 2017

(30) Foreign Application Priority Data
May 21, 2015   (CN) .......................... 2015 1 0260636

(51) Int. Cl.
*H04N 5/445*   (2011.01)
*G06F 3/00*    (2006.01)
(Continued)

(52) U.S. Cl.
CPC ..... *H04N 21/4314* (2013.01); *H04N 21/4122* (2013.01); *H04N 21/4318* (2013.01);
(Continued)

(58) Field of Classification Search
CPC ........... H04N 21/4402; H04N 21/4347; H04N 21/2365; H04N 21/4343; H04N 21/436;
(Continued)

(56) References Cited

U.S. PATENT DOCUMENTS 8,525,927 B1 *  9/2013 Chen .................... H04N 7/0117
                                                        345/690
9,185,384 B2 * 11/2015 Pandit .................. H04N 19/597
(Continued)

FOREIGN PATENT DOCUMENTS

CN           1805541 A        7/2006
CN         101087433 A       12/2007
(Continued)

OTHER PUBLICATIONS

Feb. 23, 20163—(WO) International Search Report and Written Opinion Appn PCT/CN2015/092518 with English Tran.
(Continued)

*Primary Examiner* — Nasser M Goodarzi
*Assistant Examiner* — An V Nguyen
(74) *Attorney, Agent, or Firm* — Banner & Witcoff, Ltd.

(57) ABSTRACT

Provided are a display, a display device, a player, a playing device, and a playing display system. The display comprises at least two first display interfaces, a decode, and at least two data channels. Each first display interface is configured to receive a first image data stream transmitted by a second display interface with which a connection has already been established in a player. The first image data stream includes at least one start data frame and a second image data stream, the start data frame carries a data channel identifier. The decoder is configured to parse each first image data stream, and obtain a data channel corresponding to each second image data stream. Each data channel is configured to receive and output the corresponding second image data
(Continued)

stream. The display can ensure that images displayed on a screen will not be ordered, and the operation is simple.

20 Claims, 5 Drawing Sheets

(51) Int. Cl.
  *G06F 13/00*     (2006.01)
  *H04N 21/431*    (2011.01)
  *H04N 21/4363*   (2011.01)
  *H04N 21/4402*   (2011.01)
  *H04N 21/84*     (2011.01)
  *H04N 21/41*     (2011.01)
  *H04N 21/44*     (2011.01)

(52) U.S. Cl.
  CPC ....... *H04N 21/43635* (2013.01); *H04N 21/44* (2013.01); *H04N 21/440218* (2013.01); *H04N 21/84* (2013.01)

(58) Field of Classification Search
  CPC ........... H04N 21/2662; H04N 21/4335; H04N 21/2402; H04N 21/4722; H04N 21/4131; H04N 21/4821; H04N 21/4384; H04N 21/4788; H04N 21/812; H04N 21/4667; H04N 21/251; H04N 21/6125
  USPC .. 725/44, 47, 62, 142, 78, 151, 134, 39, 97, 725/116, 46, 52, 37
  See application file for complete search history.

(56) References Cited

U.S. PATENT DOCUMENTS

| | | | |
|---|---|---|---|
| 2003/0231259 | A1 | 12/2003 | Yui et al. |
| 2008/0043031 | A1* | 2/2008 | Jagmag ............... G06F 3/04897 345/581 |
| 2013/0094580 | A1* | 4/2013 | Zhou ..................... H04N 19/13 375/240.12 |

FOREIGN PATENT DOCUMENTS

| | | |
|---|---|---|
| CN | 101198067 A | 6/2008 |
| CN | 101635125 A | 1/2010 |
| CN | 101984401 A | 3/2011 |
| CN | 102724433 A | 10/2012 |
| CN | 104320692 A | 1/2015 |
| CN | 104869457 A | 8/2015 |
| JP | 2002135679 A | 5/2002 |

OTHER PUBLICATIONS

Jul. 13, 2017—(CN) First Office Action Appn 201510260636.4 with English Tran.

* cited by examiner

DISPLAY, DISPLAY DEVICE, PLAYER, PLAYING DEVICE, AND PLAYING DISPLAY SYSTEM

The application is a U.S. National Phase Entry of International Application No. PCT/CN2015/092518 filed on Oct. 22, 2015, designating the United States of America and claiming priority to Chinese Patent Application No. 201510260636.4 filed on May 21, 2015. The present application claims priority to and the benefit of the above-identified applications and the above-identified applications are incorporated by reference herein in their entirety.

TECHNICAL FIELD

The present disclosure relates to a field of display technology, and more particularly, to a display, a display device, a player, a playing device, and a playing display system.

BACKGROUND

With the rapid development of display technology, there have been an increasing number of displays capable of supporting Ultra-High-Definition (UHD) displaying, such as UHD display TVs. Further, since users can view videos conveniently through a display such as a TV, users often transmit videos on a player such as computer, a mobile phone, or the like to a display for playing. When transmitting videos on a player to a display for playing, it needs to connect a display interface on the player with a display interface on the display via a connecting line. When there are at least two display interfaces between the player and the display, the number of the connecting lines is also at least two. Further, each display interface of the display corresponds to one data channel, image data streams respectively outputted by different data channels are to be displayed in different display regions on a screen of the display. On such a basis, when transmitting an image data stream, the player divides the image data stream into multiple sections, and transmits the image data stream to respective display interfaces of the display via respective display interfaces of the player. Respective display interfaces of the display receive the image data streams, and after processing is performed by the decoder, the decoded image data streams are outputted via each data channel. In this case, images displayed in respective display regions on the screen of the display will be combined into a complete image with a correct arrangement.

In order to ensure that the display can display an image normally and prevent an image to be displayed on the screen from disordering, before displaying the image, related technicians need to establish matching relationships between the display interfaces of the player and the display interfaces of the display in a manner of manually plugging in or out connecting lines. For example, a display can display an image normally when the player comprises three display interfaces, which are A1, A2, A3, respectively, the display also comprises three display interfaces, which are B1, B2, B3, respectively, and A1 matches with B1, A2 matches with B2, and A3 matches with B3. In this case, users need to plug in or out the connecting lines to connect A1 with B1, A2 with B2, and A3 with B3. If any of the connecting lines is connected incorrectly, images displayed in respective display regions on the screen of the display will become disordered when an image data stream received by one display interface is outputted by one corresponding data channel. Accordingly, it needs to manually re-plug in or out the connecting lines until a display interface of the display matches with a display interface of the player.

In a process of implementing the present disclosure, the inventor has found that at least the following problem in the related art: when displaying an image by a related technology, at first, it needs to manually plug in or out the connecting lines so as to ensure that the display can display the image normally, which is not only comparatively time-consuming, but also with a complex operation.

SUMMARY

In order to overcome the problem in the related art, there provide in embodiments of the present disclosure a display, a display device, a player, a playing device, and a playing display system.

In a first aspect, there is provided a display, comprising at least two first display interfaces, a decoder, and at least two data channels. One first display interface corresponds to one data channel.

Each first display interface receives a first image data stream transmitted by a second display interface with which a connection has already been established in a player, transmits the received first image data stream to the decoder. The first image data stream includes at least one start data frame and a second image data stream, the start data frame carrying a data channel identifier.

The decoder receives first image data streams transmitted by each first display interface and parses each first image data stream, obtains each second image data stream and data channels corresponding to each second image data stream, and transmits each second image data stream to the corresponding data channel.

Each data channel receives a corresponding second image data stream, and outputs the corresponding second image data stream.

In combination with the first aspect, in a first possible implementation of the first aspect, the display further comprises a first processor. The first processor is configured to obtain a data channel sequence adjusting instruction, and transmit a data decoding instruction to the decoder after obtaining the data channel sequence adjusting instruction.

The decoder is specifically configured to, when receiving the data decoding instruction transmitted by the first processor, parse each first image data stream, obtain each second image data stream and data channels corresponding to each second image data stream, and transmit each second image data stream to a corresponding data channel.

In combination with the first aspect and the above implementation, in a second possible implementation of the first aspect, each data channel is specifically configured to output a data channel identifier of each data channel, receive the corresponding second image data stream when it is determined that an arrangement sequence of all data channel identifiers is correct, and output the corresponding second image data stream.

In combination with the first aspect and the above implementation, in a third possible implementation of the first aspect, the first display interface is at least one of a DVI (Digital Visual Interface) interface, an HDMI (High Definition Multimedia Interface) interface, a DP (Display Port) interface, or an SDI (Serial Digital Interface) interface.

In combination with the first aspect and the above implementation, in a fourth possible implementation of the first aspect, the at least one start data frame includes a frame start identifier, a data channel identifier, an identifier indicating whether a data channel sequence needs to be corrected, a reserved bit, and a frame end identifier.

In a second aspect, there is provided a display device, comprising any of the displays in the first aspect and possible implementations thereof as described above.

In a third aspect, there is provided a player, comprising an encoder and at least two second display interfaces.

The encoder is configured to encode second image data streams corresponding to each data channel on a display, obtain first image data streams corresponding to each data channel, and transmit the first image data stream corresponding to each data channel to each second display interface. A first image data stream corresponding to each data channel includes at least one start data frame and a second image data stream, the start data frame carrying a data channel identifier.

Each second display interface is configured to receive the first image data streams transmitted by the encoder, and outputs the received first image data streams.

In combination with the third aspect, in a first possible implementation of the third aspect, the encoder is specifically configured to obtain an image data stream of a target video, divide the image data stream of the target video according to the number of second display interfaces, and obtain the second image data stream corresponding to each data channel. When transmitting the second image data stream corresponding to each data channel, the encoder adds at least one start data frame before first image data in the second image data stream corresponding to each data channel, obtains the first image data stream corresponding to each data channel, and transmits the first image data stream corresponding to each data channel to each second display interface. Each second image data stream includes multiple image data.

In combination with the third aspect and the above implementation, in a second possible implementation of the third aspect, the encoder is specifically configured to obtain the first image data stream corresponding to respective data channel and including at least one start data frame and the second image data stream, transmit the first image data stream corresponding to each data channel to each second display interface. The at least one start data frame in the first image data stream corresponding to each data channel is stored in advance before first image data in the corresponding second image data stream. Each second image data stream includes multiple image data.

In combination with the third aspect and the above implementation, in a third possible implementation of the third aspect, the encoder is specifically configured to, when it is detected that the player is powered on, encode the second image data streams corresponding to each data channel on the display, obtain the first image data stream corresponding to each data channel, and transmit the first image data stream corresponding to each data channel to each second display interface.

In combination with the third aspect and the above implementation, in a fourth possible implementation of the third aspect, the player further includes a second processor. The second processor is configured to obtain a data channel sequence adjusting instruction, and transmit a data encoding instruction to the encoder when obtaining the data channel sequence adjusting instruction. The encoder is specifically configured to, when receiving the data encoding instruction transmitted by the second processor, encode the second image data stream corresponding to each data channel on the display, obtain the first image data stream corresponding to each data channel, and transmit the first image data corresponding to each data channel to each second display interface.

In combination with the third aspect and the above implementation, in a fifth possible implementation of the third aspect, the second display interface is at least one of a DVI interface, an HDMI interface, a DP interface, or an SDI interface.

In combination with the third aspect and the above implementation, in a sixth possible implementation of the third aspect, the at least one start data frame includes a frame start identifier, a data channel identifier, an identifier indicating whether a data channel sequence needs to be corrected, a reserved bit, and an frame end identifier.

In a fourth aspect, there is provided a playing device. The playing device comprises the player according to any of the players in the third aspect and any possible implementations thereof as described above.

In a fifth aspect, there is provided a playing display system comprising a display and a player. The display includes the display described in the first aspect and any possible implementations thereof as described above. The player includes the player in the third aspect and any possible implementations thereof as described above.

The technical solutions provided by the embodiments of the present disclosure can bring the following advantageous effect: each first display interface of the display receives the start data frame carrying the data channel identifier, so that the decoder can obtain an identifier corresponding to each data channel after decoding, and further, each data channel can correctly output the corresponding second image data stream. Correspondingly, it can be avoided that manually plugging in or out the connecting lines is required when any of the connecting lines between the first display interfaces and the matched second display interfaces is wrongly plugged. It can ensure that images displayed on the screen will not be disordered. Moreover, the operation is simple, and the time for displaying images can be saved.

BRIEF DESCRIPTION OF THE DRAWINGS

In order to more clearly explain the technical solutions in the embodiments of the present disclosure, drawings necessary for describing the embodiments will be briefly introduced below, obviously, the following described drawings are merely some embodiments of the present disclosure, for those of ordinary skill in the art, it is possible to attain other drawings based on these drawings.

DETAILED DESCRIPTION OF THE EMBODIMENTS

In order to make the objectives, technical solutions, and the advantages of the present disclosure clearer, implementations of the present disclosure will be described in further detail in combination with the drawings.

With the rapid development of display technology, more and more displays support Ultra-High-Definition displaying. In order to enhance an user's viewing experience when watching videos, multiple display interfaces may be provided on both the player and the display, the user can use multiple connecting lines to connect display interfaces on the two devices, so that an image data stream is transmitted from the player to the display, and the display controls the screen of the display to display a video image.

Usually, in order to ensure that the video image can be displayed normally, display interfaces on the above two devices need to be connected one-to-one. When the two display interfaces connected by each connecting line between the above two devices match to each other, the decoder in the display can parse the transmitted image data stream, so that the decoded image data is displayed in a corresponding display region on the screen of the display, so as to implement a normal displaying of the image.

Figure 1:
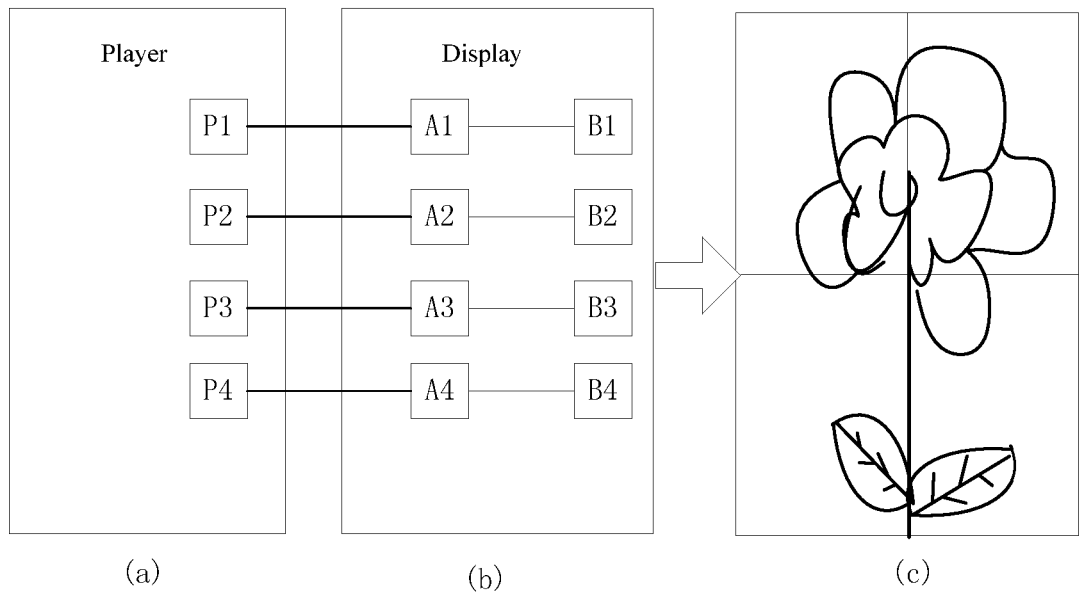
FIG. 1 is a schematic diagram of an image displayed on a screen of a display provided by an embodiment of the present disclosure.

As shown in FIG. 1, Part (b) in FIG. 1 is a schematic diagram of structure of a display. The display comprises four first display interfaces A1, A2, A3, A4 and four data channels B1, B2, B3, B4. One first display interface corresponds to one data channel. An image data stream received by one first display interface will be outputted by its corresponding data channel, and the image data streams outputted by different data channels will be displayed in different display regions on the screen of the display. For example, an image corresponding to an image data stream outputted by B1 will be displayed on a display region at an upper left corner of the screen of the display, an image corresponding to an image data stream outputted by B2 will be displayed on a display region at an upper right corner of the screen of the display, an image corresponding to an image data stream outputted by B3 will be displayed on a display region at a lower left corner of the screen of the display, and an image corresponding to an image data stream outputted by B4 will be displayed on a display region at a lower right corner of the screen of the display.

Part (a) in FIG. 1 is a schematic diagram of structure of a player. The player comprises four second display interfaces P1, P2, P3, P4. A1, A2, A3, A4 match P1, P2, P3, P4, respectively. When respective connecting lines connect P1 with A1, P2 with A2, P3 with P4, and A3 with A4, respectively, the image data streams outputted by P1, P2, P3, P4 are outputted by data channels B1, B2, B3, B4 corresponding to A1, A2, A3, A4, respectively. The screen of the display can display a complete flower as shown in Part (c) of FIG. 1.

Figure 2:
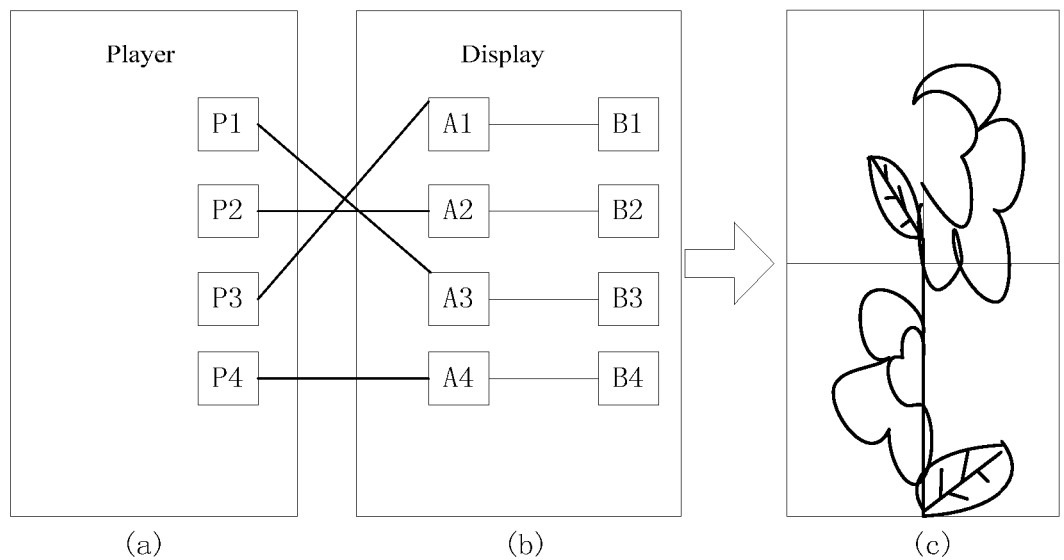
FIG. 2 is a schematic diagram of an image displayed on another screen of a display provided by an embodiment of the present disclosure.

When the display interfaces on the display and the player are of a relatively large number, such a case as a connection sequence error is easy to occur, causing any of the second display interfaces of the player not matching to the first display interfaces of the display. In this case, the images displayed on the screen of the display will show disorder. As shown in FIG. 2, display interfaces between Part (a) and Part (b) in FIG. 2 are wrongly connected, that is, P1 is wrongly connected with A3, and P3 is wrongly connected with A1. In combination with positional relationships among the first display interfaces, the data channels, and the display regions shown in Part (b) of FIG. 1, in this case, A1 will receive the image data stream transmitted by P3, while the image data stream transmitted by P3 is an image data stream that should be displayed in a lower left corner. When outputting via B1 corresponding to A1, displaying is made in the display region in the upper left corner. That is to say, the content that should be in the display region in the lower left corner in Part (c) of FIG. 2 is displayed in the display region in the upper left corner, and the content that should be in the display region in the upper left corner in Part (c) of FIG. 2 is displayed in the display region in the lower left corner, resulting in that the images displayed on the entire screen of the display are disordered, leading to a poor display effect.

When this problem occurs, the prior art requires users to re-plug in or out the connecting lines between the display and the player, until each of the second display interfaces of the player and each of the first display interfaces of the display match, respectively, so as to achieve normal image displaying. However, such operations are very tedious. In order to overcome the above problem, the embodiments of the present disclosure provide a display, a display device, a player, a playing device, and a playing display system.

Figure 3:
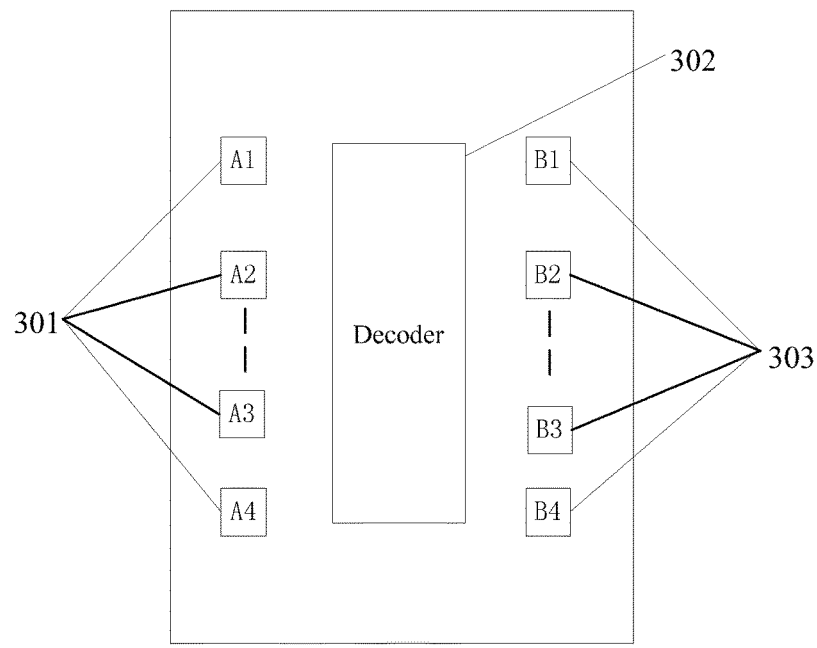
FIG. 3 is a schematic diagram of structure of a display provided by an embodiment of the present disclosure.

FIG. 3 is a schematic diagram of structure of a display provided by an embodiment of the present disclosure. As shown in FIG. 3, the display comprises multiple first display interfaces 301, a decoder 302, and multiple data channels 303. One first display interface 301 corresponds to one data channel 303. It should be noted that, FIG. 3 merely illustrates a display comprising four first display interfaces 301. However, in a specific implementation, the display may also comprise other numbers of the first display interfaces 301. For example, the display comprises eight first display interfaces, sixteen first display interfaces etc. An embodiment of the present disclosure makes no limitation to the number of the first display interfaces 301.

In combination with FIG. 3, the first display interface A1 corresponds to the data channel B1, the first display interface A2 corresponds to the data channel B2, the first display interface A3 corresponds to the data channel B3, and the first display interface A4 corresponds to the data channel B4. Any first display interface 301 corresponding to a data channel 303 refers to that an image data stream received by the first display interface 301 is outputted by its corresponding data channel 303.

Each first display interface 301 receives a first image data stream transmitted by a second display interface with which a connection has already been established in a player, and transmits the received first image data stream to the decoder 302. The first image data stream includes at least one start data frame and a second image data stream. The start data frame carries a data channel identifier.

Specifically, for any first display interface 301, a second display interface contained in the player, with which the first display interface 301 has already established connection, refers to the second display interface that is currently connected with the first display interface 301 via a connecting line. For example, in combination with FIG. 3, if the second display interface P1 in the player is currently connected with the first display interface A3 in the display via a connecting line, for the first display interface A3, the second display interface with which the first display interface A3 has already established a connection is P1. When any of the first display interfaces 301 and any of the second display interfaces of the player are connected via a connecting line, the first image data stream transmitted by the second display interface is transmitted to the first display interface 301 connected with the second display interface. In combination with FIG. 3 and the above example, the first image data stream transmitted by the second display interface P1 is to be transmitted to the first display interface A3. Further, the image data stream received by the first display interface A3 will be outputted by the data channel B3.

In an embodiment of the present disclosure, the display comprises at least two first display interfaces 301, therefore, after the image data stream transmitted by the player is received by the display, the image data stream received by each first display interface will be displayed in different display regions on the screen of the display. For example, in combination with FIGS. 1 to 3, in a case where the display comprises four first display interfaces 301, when the screen of the display displays an image, the entire display region of the screen will be divided into four display regions. When the image data streams received by different first display interfaces 301 are outputted by the data channel 303 corresponding to each display interface, the image data streams will be displayed in different display regions.

In addition, a target video played by the display is formed by continuously playing of multiple images, data to which the continuously played images correspond forming the image data stream of the target video. When multiple images of the target video are displayed in multiple different display regions of the screen of the display, the player needs to first divide the image data stream of the whole target video into multiple partial image data streams, and output them to respective first display interfaces 301 of the display by respective display interfaces of the player. In an embodiment of the present disclosure, the image data stream associated with the target video received by each first display interface 301 is defined as the second image data stream.

For example, in combination with FIGS. 1 to 3, when the display comprises four first display interfaces 301, the player will divide the entire image data stream of the target video into four parts of second image data streams, wherein each second image data stream includes multiple image data. Each image data corresponds to data in a partial image region in one image. For example, when an image corresponding to the image data stream outputted by a certain data channel 303 is displayed in a display region in the upper left corner of the screen, the second image data stream corresponding to this data channel is the image data corresponding to the image in the upper left corner region of the screen, each image data in the second image data stream is the image data corresponding to the image in the left upper corner region of one image.

Further, in order to ensure that the screen of the display still can normally display an image even if a connecting line that connects any of the second display interfaces of the player and any of the first display interfaces 301 of the display is wrongly connected, in an embodiment of the present disclosure, at least one start data frame is provided before first image data in each second image data stream, the at least one start data frame carrying a data channel identifier. Each second image data stream and the at least one start data frame corresponding thereto compose one first image data stream. With the data channel identifier, each first display interface 301 can determine the second image data stream included in the first image data stream received by it should be outputted by which data channel.

To a data format of the start data frame, an embodiment of the present disclosure makes no specific limitations. In a specific implementation, the start data frame may include a frame start identifier, a data channel identifier, an identifier indicating whether a data channel sequence needs to be corrected, a reserved bit, and an frame end identifier. Referring to Table 1, Table 1 shows a data format of the start data frame.

TABLE 1

| Format of the start data frame | Frame start identifier | Data channel identifier | Whether a data channel sequence needs to be corrected | Reserved bit | Frame end identifier |
|---|---|---|---|---|---|
| Data channel B1 | 1101 | 00000000 | 00: Yes; 01: No | Six bits | 1001 |
| Bits | 23-20 | 19-12 | 11-10 | 9-4 | 3-0 |

It should be noted that, Table 1 merely illustrates with each start data frame occupying 24 bits as an example. In a specific implementation, each start data frame may also occupy the other numbers of bits, and an embodiment of the present disclosure makes no limitation to the number of bits occupied by each start data frame. In addition, the data in Table 1 is merely used as an example, e.g., "1101" is used as the frame start identifier, and each data in Table 1 does not constitute limitation to an embodiment of the present disclosure. In addition, Table 1 merely lists the format of the start data frame of the data channel B1, as for the other data channels, data structure of the other start data frames are the same as the data structure of the start data frame of the data channel B1, no more is listed here. Of course, the start data frame may also be of other data formats, as long as the data channel identifier is carried in the start data frame, and an embodiment of the present disclosure makes no limitation to the specific data format of the start data frame.

As to the number of the start data frame in the first image data stream, an embodiment of the present disclosure makes no limitation. For example, only one start data frame may be included in the first image data stream. However, when only one start data frame is included in the first image data stream, in order to avoid occurrence of such a case that the decoder 302 fails to parse the start data frame in the first image data stream and thereby cannot obtain the data channel identifier, multiple start data frames, for example, three, five start data frames and so on, may be included in the first image data stream.

In addition, as to the type of the first display interfaces 301 and the second display interfaces, there may be of many types. For example, the first display interface 301 and the second display interface include but not limited to one of a DVI interface, an HDMI interface, a DP interface, or an SDI interface, as long as it is ensured that the type of the first display interface and the type of the second display interface are the same. For example, when the first display interface 301 is an HDMI interface, the second display interface also is an HDMI interface.

After receiving the first image data stream transmitted by each first display interface 301, the decoder 302 parses each first image data stream, obtains each second image data stream and a data channel 303 corresponding to each second image data stream, and transmits each second image data stream to the corresponding data channel 303. For example, in combination with FIG. 3, if P1 and A3 are connected via a connecting line, the first image data stream received by A3 includes B1 and the second image data stream that should be outputted by B1. After receiving the first image data stream transmitted by the first display interface A3, the decoder 302 parses the first image data stream, obtains the data channel identifier B1 corresponding to the second image data stream contained in the first image data stream and the second image data stream. In this case, the decoder 302 can determine that the second image data stream included in the first image data stream received by the first display interface A3 should be outputted by the data channel B1.

Figure 4:
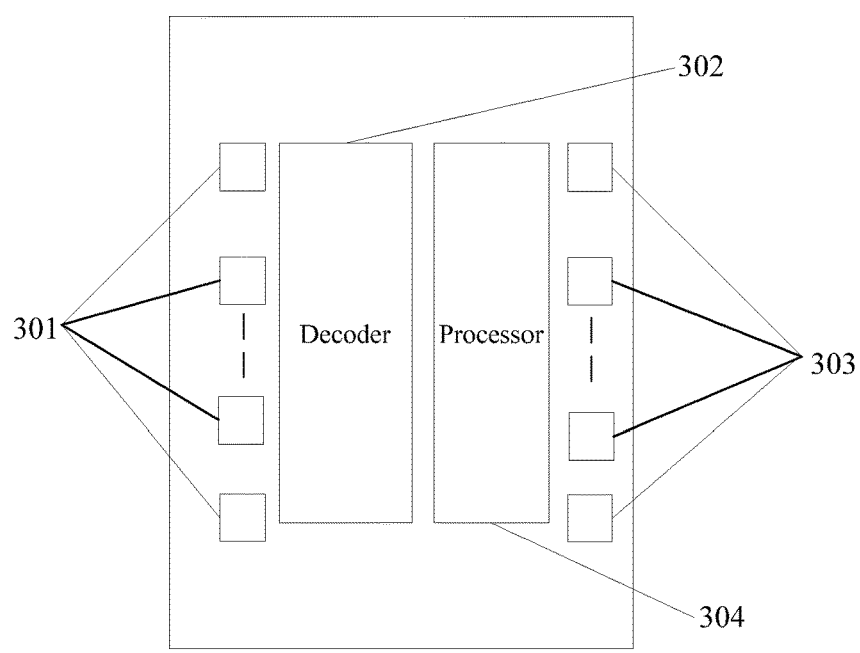
FIG. 4 is a schematic diagram of structure of another display provided by an embodiment of the present disclosure.

Optionally, in an embodiment of the present disclosure, parsing, by the decoder 302, each received first image data stream is performed under a triggering of a certain data decoding instruction. This data decoding instruction may be transmitted by a first processor 304 to the decoder 302. Transmitting the data decoding instruction to the decoder 302 by the first processor 304 may be implemented after obtaining the data channel sequence adjusting instruction. Thus, in another embodiment of the present disclosure, the display may further comprise a first processor 304. Referring to FIG. 4, FIG. 4 shows a schematic diagram of another display, the display shown in FIG. 4 further comprises the first processor 304.

Specifically, the first processor 304 may be configured to obtain a data channel sequence adjusting instruction, and transmit a data decoding instruction to the decoder 302 after obtaining the data channel sequence adjusting instruction. The decoder 302 is specifically configured to, when receiving the data decoding instruction transmitted by the first processor 304, parse each first image data stream, and obtain a data channel 303 corresponding to each second image data stream and each second image data stream, and transmits each second image data stream to the corresponding data channel 303.

As to the manner in which the first processor 304 obtains the data channel sequence adjusting instruction, an embodiment of the present disclosure makes no specific limitations. For example, when a user finds that a certain first display interface 301 on the display is apparently not connected with the matched second display interface on the player, for the sake of enabling the display to display an image normally, the user determines that it needs to adjust the data channel sequence. In this case, the user may control to perform an operation of adjusting the data channel sequence via keys or a remote control. Thus, in an embodiment of the present disclosure, the display can provide an option for adjusting the data channel sequence. When the user selects the option of adjusting the data channel sequence via the remote control or the keys on the display, the first processor 304 determines that the data channel sequence adjusting instruction is obtained, and transmits a data decoding instruction to the decoder 302.

In addition, in an embodiment of the present disclosure, when the decoder 302 performs parsing to obtain respective second image data streams, the first processor 304 can be further configured to process respective second image data streams, so that the display can display an image with a higher quality. For example, the first processor 304 may further adjust color aberration, contrast, brightness of respective pixels in respective second image data streams, and perform a stretch processing, an enhancement processing on an image, or the like.

Each data channel 303 receives the corresponding second image data stream, and outputs the corresponding second image data stream. The second image data stream corresponding to each data channel 303 is the second image data stream included in the first image data stream received by the first display interface corresponding to each data channel 303. For example, the data channel B1 corresponds to first display interface A1, then the second image data stream corresponding to the data channel B1 is the second image data stream included in the first image data stream received by the first display interface A1.

Optionally, after the decoder 302 performs parsing to obtain each data channel 303, in order to allow the user to determine whether a parsing result is correct, in an embodiment of the present disclosure, each data channel may also first output a data channel identifier of each data channel. After the display displays an arrangement sequence of all the data channels identifiers, the user can determine whether the arrangement sequence of all the data channels identifiers is correct according to the displayed arrangement sequence of the each data channel. When the user determines that the arrangement sequence of all the data channels identifiers is correct, the user can transmit a confirmation instruction via the remote control or keys on the display. Correspondingly, each data channel further outputs the corresponding second image data stream. When the user determines that an arrangement sequence of any data channel identifier is not correct, the option for adjusting the data channel sequence may be selected anew via the remote control or keys on the display, until the arrangement sequence of all the data channels identifiers is correct.

When each user determines whether the arrangement sequence of all the data channels identifiers is correct, it may be implemented by judging whether the arrangement sequence of respective data channel identifiers displayed on the screen of the display is the same as a predetermined arrangement sequence of data channel identifiers. When the arrangement sequence of respective data channel identifiers displayed on the screen of the display is the same with the predetermined arrangement sequence of data channel identifiers, it is determined that the arrangement sequence of all the data channels is correct.

Figure 5:
FIG. 5 is a schematic diagram of a predetermined arrangement sequence of data channel identifiers provided by an embodiment of the present disclosure.

Referring to FIG. 5, FIG. 5 shows a schematic diagram of a predetermined arrangement sequence of data channel. If the sequence of identifiers of each data channel displayed on the current screen is the same with the predetermined arrangement sequence of the data channel identifiers shown in FIG. 5, it is determined that the arrangement sequence of all the data channels is correct; otherwise, it is determined that there is a data channel with incorrect arrangement sequence among all the data channels.

The each data channel first output identifiers of the each data channel, and will not output the second image data streams unless it is determined that the arrangement sequence of all the data channels is correct. Disorder can be avoided for the images displayed on the screen due to an incorrect arrangement sequence of any data channel identifier, so that user experience can be improved. In addition, when an arrangement sequence of any data channel identifier is not correct, the each data channel may not receive the second image data streams, and thus system resources can be saved.

It should be noted that, the displays shown in FIGS. 3 and 4 only illustrate parts of components related to the embodiments of the present disclosure. In a specific implementation, the display further comprises other components related to video playing. For example, the display may further comprise an audio decoder, a wireless transmission interface, a protocol processing unit, and other components. Further, connection relationships of respective components in the display may be arranged as needed. FIGS. 3 and 4 fail to explicitly indicate connection relationships between respective components in the display.

Each first display interface in the display provided by an embodiment of the present disclosure receives the start data frame carrying the data channel identifier, so that the decoder can obtain the corresponding identifier of each data channel after decoding, and further makes each data channel able to output the corresponding second image data stream correctly. Accordingly, it can avoid such a case that manual re-plugging in or out the connecting lines is needed when any of connecting lines between the first display interfaces and the match second display interface in the player are mistakenly plugged. It can ensure that images displayed on the screen will not be disordered. Moreover, the operation is simple, and the time for displaying images can be saved.

An embodiment of the present disclosure further provides a display device, which may comprise the display provided in the embodiment corresponding to FIG. 3 or FIG. 4 as described above. The display may be a High-Definition television, an Ultra-High-Definition television, or the like.

Figure 6:
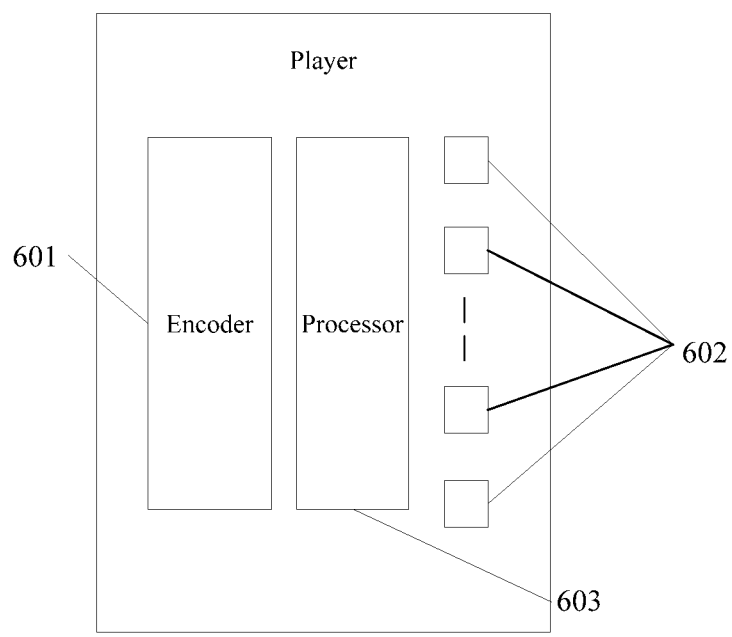
FIG. 6 is a schematic diagram of structure of a player provided by an embodiment of the present disclosure.

An embodiment of the present disclosure further provides a player. FIG. 6 is a schematic diagram of structure of a player provided by an embodiment of the present disclosure. As shown in FIG. 6, the player comprises an encoder 601 and at least two second display interfaces 602. FIG. 6 illustrates merely with that the player comprising four second display interfaces 602 as an example. However, as to the number of the second display interfaces 602, it may be arranged as needed in practice. For example, the player may comprise eight second display interfaces, sixteen second display interfaces, or the like. An embodiment of the present disclosure makes no limitation to the number of the second display interfaces 602.

The encoder 601 is configured to encode second image data streams corresponding to each data channel on a display, obtain first image data streams corresponding to each data channel, and transmit the first image data stream corresponding to each data channel to each second display interface 602. The first image data stream corresponding to each data channel includes at least one start data frame and a second image data stream. The start data frame carries a data channel identifier.

The data channel, the second image data stream, the first display interface, and the second display interface and their relationships have been described in the above embodiments, reference may be made to the above embodiments, and no more details are repeated here. As to the data format of the start data frame, reference may be also made to the data format of the start data frame described in the content of the above embodiments, and no more details are repeated here.

As to the manner in which the encoder 601 encodes the second image data streams corresponding to the each data channel, an embodiment of the present disclosure makes no specific limitations. In a specific implementation, it includes but not limited to the following two manners.

In the first manner, the encoder 601 obtains an image data stream of a target video, divides the image data stream of the target video according to the number of second display interfaces 602, and obtains the second image data stream corresponding to each data channel. When transmitting the second image data stream corresponding to each data channel, the encoder adds at least one start data frame before first image data in the second image data stream corresponding to each data channel, obtains the first image data stream corresponding to each data channel. The target video is a video to be displayed on the display.

For example, in combination with FIG. 6, when the player comprises four second display interfaces 602, one second display interface 602 is connected with one first display interface of the display, and one first display interface corresponds to one data channel. Thus, the player first divides the image data stream of the target video into second image data streams respectively corresponding to the four data channels. When transmitting the second image data stream corresponding to each data channel, in order to enable the display to determine via which data channel respective second image data streams are to be outputted, the encoder 601 adds at least one start data frame before first image data in the second image data stream corresponding to each data channel, so as to obtain the first image data stream corresponding to each data channel.

The number of the start data frame included in the first image data stream may be one or more. When multiple start data frames are included, the following case can be avoided: when only one start data frame is included, if the display fails to receive the start data frame, the data channel corresponding to the second image data stream cannot be determined. Thus, when multiple start data frames are included in the first image data stream, it can ensure that the display can identify the data channels corresponding to respective second image data streams.

In the second manner, the encoder 601 directly obtains the first image data stream including at least one start data frame and the second image data stream. The at least one start data frame in the first image data stream corresponding to each data channel is stored in advance before first image data in the corresponding second image data stream. The second image data stream includes multiple image data. That is to say, in this manner, the at least one start data frame is included directly before the image data stream of the target video. For example, when producing the image data stream of the target video, the start data frame is directly produced before the first image data in the image data stream.

Such encoding manner of the encoder 601 can be applied to a player lacking a function of adjusting a data channel. Lacking a function of adjusting a data channel refers to that the encoder of such player is incapable of automatically adding the start data frame before the second image data stream.

In addition, there may be many times at which the encoder 601 encodes the second image streams corresponding to each data channel on the display. In a specific implementation, it includes but not limited to the following two types.

For the first type, when the encoder 601 detects that the player is powered on, the encoder 601 is triggered to encode the second image data streams corresponding to each data channel on the display. As to the manner in which the encoder 601 detects the powering on of the player, an embodiment of the present disclosure makes no specific limitations. For example, when detecting that an input level of the player changes from a low level to a high level, the decoders determines that the player has already been powered on.

For the second type, when obtaining the data encoding instruction, the encoder 601 encodes the second image data streams corresponding to each data channel on the display.

The data encoding instruction obtained by the encoder 601 may be transmitted by the second processor 603 included in the player. In this case, the player may further comprise the second processor 603. The second processor 603 may obtain a data channel sequence adjusting instruction, and transmit a data encoding instruction to the encoder when obtaining the data channel sequence adjusting instruction.

As to the manner in which the second processor 603 obtains the data channel sequence adjusting instruction, reference may be made to the manner in which the first processor 304 in the display obtains the data channel instruction as described above, and no more details are repeated here.

In addition, each second display interface 602 receives the first image data stream transmitted by the encoder 601, and outputs the received first image data stream. The second display interface 602 may be one of a DVI interface, an HDMI interface, a DP interface, or an SDI interface. An embodiment of the present disclosure makes no limitation to the type of the second display interface, so long as it is ensured that the type of the second display interface is the same as the type of the first display interface on the display.

Any second display interface 602 can output the first image data stream received from the encoder 601 by it to the first display interface connected with it. For example, when the second display interface P1 is connected with the first display interface A3 via a connecting line, the second display interface P1 transmits the first image data stream received from the encoder 601 by it to the first display interface A3.

It needs to be noted that, the above contents only explain parts of the components related with the embodiments of the present disclosure. In fact, the player further comprises other components, said other components can achieve functions of the player in combination with respective components mentioned above, an embodiment of the present disclosure provides no detailed description about the other components comprised by the player. In addition, as to the connection relationships of respective components, an embodiment of the present disclosure also makes no specific limitation. In a specific implementation, any two or more components may be connected as needed.

In the player provided by an embodiment of the present disclosure, the second image data stream corresponding to each data channel in the display is encoded by the encoder to obtain the first image data stream including the least one start data frame that carries the data channel identifier, so that after the decoder of the display parses the received first image data stream, the data channel identifier of each data channel can be obtained, each data channel can further output the corresponding second image data stream correspondingly. Accordingly, it can avoid such a case that a manual re-plugging in or out the connecting lines is required when any of the connecting line between the first display interfaces and the matched second display interface in the player is mistakenly plugged. It can ensure that images displayed on the screen will not be disordered. Moreover, the operation is simple, and the time for displaying images can be saved.

An embodiment of the present disclosure further provides a playing device. The playing device may comprise the player provided in the embodiment corresponding to FIG. 6. The playing device may be a desktop computer, a mobile phone, a tablet computer, a set-top box, or the like.

Figure 7:
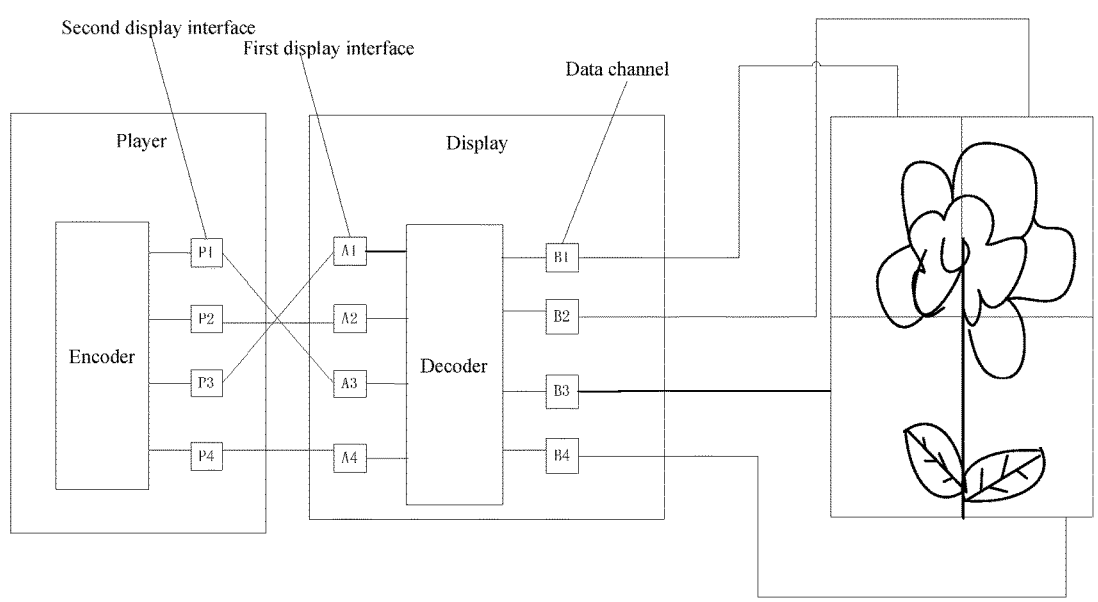
FIG. 7 is a schematic diagram of structure of a playing display system provided by an embodiment of the present disclosure.

Based on the display and the player provided by the above embodiments, the display and the player may be connected as shown in FIG. 7 so as to form a playing display system.

Figure 8:
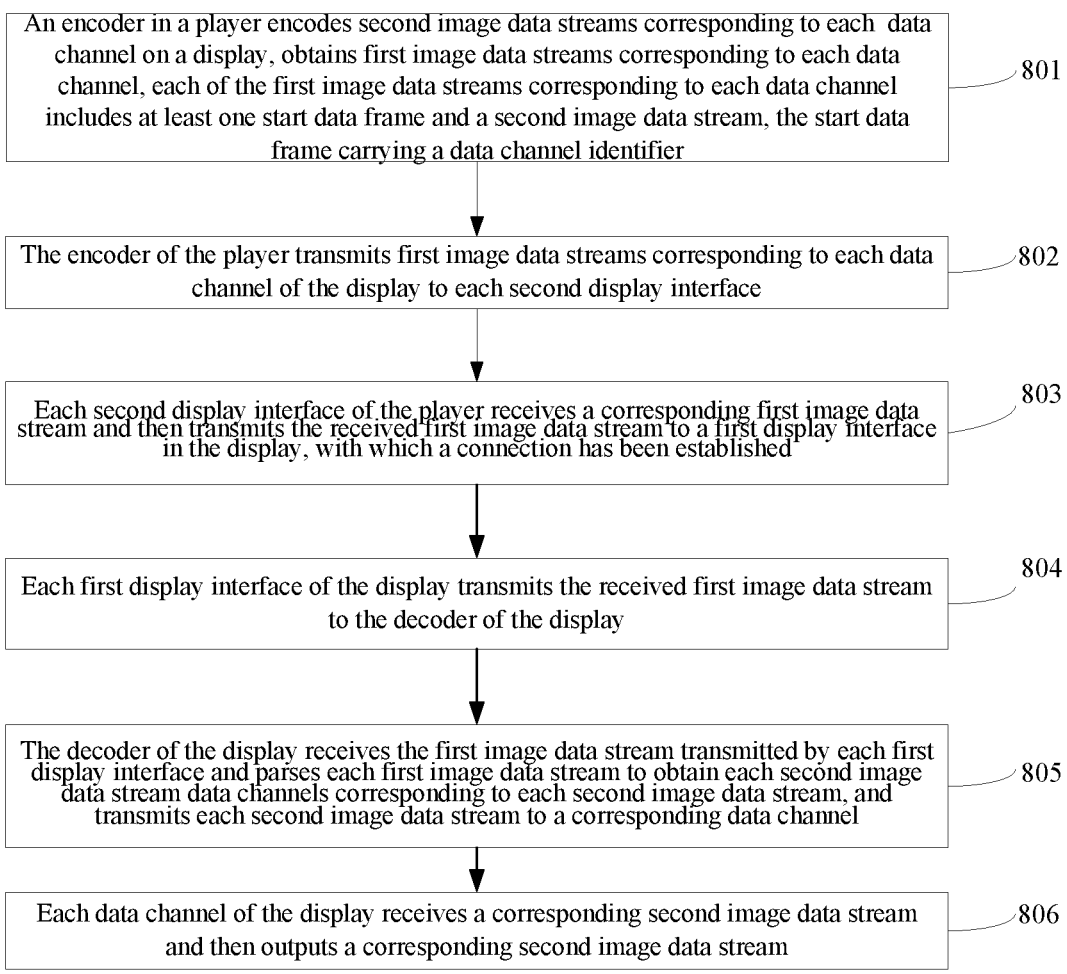
FIG. 8 is a flowchart of a playing display method provided by an embodiment of the present disclosure.

Based on this playing display system, an embodiment of the present disclosure further provides a playing display method. Referring to FIG. 8, the playing display method comprises steps 801 to 806.

At step 801, an encoder in a player encodes a second image data stream corresponding to each data channel on a display, obtains a first image data stream corresponding to each data channel. The first image data stream corresponding to each data channel includes at least one start data frame and a second image data stream. The start data frame carries a data channel identifier.

As to the manner in which and the time at which the encoder in the player encodes the second image data stream, reference may be made to the descriptions in the associated embodiment described in combination with FIG. 6, no more details are repeated here.

At step 802, the encoder of the player transmits the first image data stream corresponding to each data channel of the display to each second display interface.

At step 803, after receiving the corresponding first image data stream, each second display interface of the player transmits the received first image data stream to a first display interface in the display, with which the second display interface has already established a connection.

The second display interface of the player is connected with the first display interface of the display via a connecting line. With the playing display method provided by an embodiment of the present disclosure, when any of the first display interfaces of the display is connected with any of the second display interfaces of the player via a connecting line, the display can always display an image normally.

At step 804, each first display interface of the display transmits the received first image data stream to the decoder of the display.

At step 805, the decoder of the display receives the first image data stream transmitted by each first display interface and parses each first image data stream, obtains the data channel corresponding to each second image data stream and each second image data stream, and transmits each second image data stream to the corresponding data channel.

As to the manner in which the decoder parses each first image data stream, detailed descriptions are provided in the contents of the embodiments corresponding to FIG. 3 or 4 described above, a reference may be made to content in the embodiment corresponding to the above FIG. 3 or 4, no more details are provided here.

At step 806, after receiving the corresponding second image data stream, each data channel of the display outputs the corresponding second image data stream.

In the playing display system provided by an embodiment of the present disclosure, the second image data corresponding to each data channel in the display is encoded by the encoder in the display to obtain the first image data stream including at least one start data frame that carries the data channel identifier, so that after the decoder of the display parses the received first image data, the data channel identifier of each data channel can be obtained, and each data channel can further output the corresponding second image data stream correspondingly. Accordingly, it can avoid such a case that a manual re-plugging in or out the connecting lines is required when any of the connecting lines between the first display interfaces and the matched second display interfaces in the player is mistakenly plugged. It can ensure that images displayed on the screen will not be disordered. Moreover, the operation is simple, and the time for displaying images can be saved.

As will be appreciated by those of ordinary skill in the art, all or parts of the steps in the above embodiments may be implemented by hardware, or by a program that instructs relevant hardware, the program may be stored in a computer readable storage medium, the aforesaid storage medium may be a read-only memory, a magnetic disc, an optical disk, or the like.

The foregoing is only preferred embodiments of the present disclosure, and is not intended to limit the present disclosure, any modification, equivalent replacement, improvement and so on made within the spirit and principle of the present disclosure should be included in the protection scope of the present disclosure.

The present application claims priority of the Chinese Patent Application No. 201510260636.4 filed on May 21, 2015, the entire disclosure of which is hereby incorporated in full text by reference as part of the present application.

What is claimed is:

1. A display, comprising:
    at least two first display interfaces, a decoder, and at least two data channels, wherein the at least two first display interfaces have a one-to-one correspondence with the at least two data channels, and a correspondence between the at least two first display interfaces and the at least two data channels is determined by the decoder;
    wherein, when each of the at least two first display interfaces is connected, via connecting lines, to a corresponding one of at least two second display interfaces of a player, in a one-to-one connection to transmit at least two first image data streams from the at least two second display interfaces of the player to the at least two first display interfaces, the at least two first display interfaces receive the at least two first image data streams, transmit the received at least two first image data streams to the decoder, each first image data stream of the at least two first image data streams including at least one start data frame and a second image data stream, the start data frame carrying a data channel identifier, wherein the data channel identifier indicates a data channel, among the at least two data channels, corresponding to the first image data stream;
    the decoder receives the at least two first image data streams transmitted from the at least two first display interfaces, obtains each second image data stream and data channel identifier corresponding to each second image data stream according to the at least one start data frame included in each of the at least two first image data streams, determines the at least two data channels corresponding to the at least two display interfaces according to the data channel identifiers, and transmits each second image data stream to the corresponding data channel; and
    each data channel receives a corresponding second image data stream, and outputs the corresponding second image data stream.

2. The display according to claim 1, wherein
    the display further comprises a first processor configured to obtain a data channel sequence adjusting instruction, and transmit a data decoding instruction to the decoder after obtaining the data channel sequence adjusting instruction, wherein
    when receiving the data decoding instruction transmitted by the first processor, the decoder parses each first image data stream, and obtains each second image data stream and data channel corresponding to each second image data stream, and transmits each second image data stream to a corresponding data channel.

3. The display according to claim 1, wherein each data channel outputs a data channel identifier of each data channel, and when it is determined that an arrangement sequence of all data channel identifiers is correct, a corresponding second image data stream is received and outputted.

4. The display according to claim 1, wherein each of the at least two first display interfaces is at least one of a Digital Visual Interface (DVI), a High Definition Multimedia Interface (HDMI), a Display Port (DP) interface, or a Serial Digital Interface (SDI).

5. The display according to claim 1, wherein the at least one start data frame includes a frame start identifier, the data channel identifier, an identifier indicating whether a data channel sequence needs to be corrected, a reserved bit, and a frame end identifier.

6. A display device, comprising the display according to claim 1.

7. The display device according to claim 6, wherein
    the display further comprises a first processor configured to obtain a data channel sequence adjusting instruction, and transmit a data decoding instruction to the decoder after obtaining the data channel sequence adjusting instruction, and
    when receiving the data decoding instruction transmitted by the first processor, the decoder parses each first image data stream, and obtains each second image data stream and data channel and corresponding to each second image data stream, and transmits each second image data stream to a corresponding data channel.

8. The display device according to claim 6, wherein each data channel outputs a data channel identifier of each data channel, and when it is determined that an arrangement sequence of all data channel identifiers is correct, a corresponding second image data stream is received and outputted.

9. A playing display system comprising a display and a player, wherein
    the display is the display according to claim 1; and
    the player comprises:
        an encoder, at least two second display interfaces, and a storage,
    wherein, when each of the at least two first display interfaces is connected to a corresponding one of the at least two second display interfaces of the player in a one-to-one connection to transmit at least two first image data streams from the at least two second display interfaces of the player to the at least two display interfaces of the display, the encoder encodes a second image data stream corresponding to each data channel on the display, obtains a first image data stream corresponding to each data channel, transmits the first image data stream corresponding to each data channel to each second display interface, the first image data stream corresponding to each data channel including at least one start data frame and a second image data stream, the start data frame carrying a data channel identifier which indicates a data channel corresponding to one of the at least two first display interfaces, and the storage stores in advance the at least one start data frame corresponding to the second image data stream, and the encoder obtains the at least one start data frame from the storage; and
    each second display interface receives the first image data stream transmitted by the encoder, and outputs the received first image data stream.

10. A player, comprising:
an encoder, at least two second display interfaces, and a storage;
wherein, when each of the at least two second display interfaces is connected, via connecting lines, to a corresponding one of at least two first display interfaces of a display in a one-to-one connection to transmit at least two first image data streams from the at least two second display interfaces of the player to the at least two first display interfaces of the display, the encoder encodes a second image data stream corresponding to each data channel of the display, obtains a first image data stream corresponding to each data channel, transmits the first image data stream corresponding to each data channel to each second display interface, the first image data stream corresponding to each data channel including at least one start data frame and a second image data stream, the start data frame carrying a data channel identifier which indicates a data channel corresponding to one of the at least two first display interfaces, and the storage stores in advance the at least one start data frame corresponding to the second image data stream, and the encoder obtains the at least one start data frame from the storage; and
each second display interface receives the first image data stream transmitted by the encoder, and outputs the received first image data stream.

11. The player according to claim 10, wherein the encoder obtains an image data stream of a target video, divides the image data stream of the target video according to a number of second display interfaces, obtains the second image data stream corresponding to each data channel, and when transmitting the second image data stream corresponding to each data channel, adds at least one start data frame before first image data in the second image data stream corresponding to each data channel, obtains the first image data stream corresponding to each data channel, transmits the first image data stream corresponding to each data channel to each second display interface, each second image data stream including multiple image data.

12. The player according to claim 10, wherein the encoder is configured to obtain the first image data stream corresponding to each data channel and including at least one start data frame and the second image data stream, transmit the first image data stream corresponding to each data channel to each second display interface, the at least one start data frame in the first image data stream corresponding to each data channel being stored in advance before first image data in the corresponding second image data stream, each second image data stream including multiple image data.

13. The player according to claim 10, wherein the encoder is configured to, when it is detected that the player is powered on, encode the second image data stream corresponding to each data channel of the display, obtain the first image data stream corresponding to each data channel, and transmit the first image data stream corresponding to each data channel to each second display interface.

14. The player according to claim 10, further comprising a second processor,
wherein the second processor obtains a data channel sequence adjusting instruction, and transmits a data encoding instruction to the encoder when obtaining the data channel sequence adjusting instruction, and
wherein the encoder is configured to, when receiving the data encoding instruction transmitted by the second processor, encode the second image data stream corresponding to each data channel on the display, obtain the first image data stream corresponding to each data channel, and transmit the first image data stream corresponding to each data channel to each second display interface.

15. The player according to claim 10, wherein each of the at least two second display interfaces is at least one of a Digital Visual Interface (DVI), a High Definition Multimedia Interface (HDMI), a Display Port (DP) interface, or a Serial Digital Interface (SDI).

16. The player according to claim 10, wherein the at least one start data frame includes a frame start identifier, the data channel identifier, an identifier indicating whether a data channel sequence needs to be corrected, a reserved bit, and an frame end identifier.

17. A playing device, comprising the player according to claim 10.

18. The playing device according to claim 17, wherein the encoder obtains an image data stream of a target video, divides the image data stream of the target video according to a number of second display interfaces, obtains the second image data stream corresponding to each data channel, and when transmitting the second image data stream corresponding to each data channel, adds at least one start data frame before first image data in the second image data stream corresponding to each data channel, obtains the first image data stream corresponding to each data channel, transmits the first image data stream corresponding to each data channel to each second display interface, each second image data stream including multiple image data.

19. The playing device according to claim 17, wherein the encoder is configured to obtain the first image data stream corresponding to each data channel and including at least one start data frame and the second image data stream, transmit the first image data stream corresponding to each data channel to each second display interface, the at least one start data frame in the first image data stream corresponding to each data channel being stored in advance before first image data in the corresponding second image data stream, each second image data stream including multiple image data.

20. The playing device according to claim 17, wherein the encoder is configured to, when it is detected that the player is powered on, encode the second image data stream corresponding to each data channel of the display, obtain the first image data stream corresponding to each data channel, and transmit the first image data stream corresponding to each data channel to each second display interface.

* * * * *